(12) United States Patent
Elias et al.

(10) Patent No.: US 7,272,216 B2
(45) Date of Patent: Sep. 18, 2007

(54) INCOMPLETE CALL NOTIFICATION

(75) Inventors: Eran Elias, Even Yehuda (IL); Amnon Keiny, Tel Aviv (IL)

(73) Assignee: Comverse Ltd., Tel Aviv (IL)

( * ) Notice: Subject to any disclaimer, the term of this patent is extended or adjusted under 35 U.S.C. 154(b) by 582 days.

(21) Appl. No.: 10/670,726

(22) Filed: Sep. 26, 2003

(65) Prior Publication Data
US 2005/0069109 A1    Mar. 31, 2005

(51) Int. Cl.
*H04M 15/00* (2006.01)
(52) U.S. Cl. .................... 379/111; 379/32.01; 379/133; 379/207.04

(58) Field of Classification Search ............... 379/111, 379/112.01, 112.08–112.09, 133–134, 137–138, 379/201.1, 207.04–207.05, 207.08–207.1, 379/209.01, 32.01; 455/509, 512
See application file for complete search history.

(56) References Cited

U.S. PATENT DOCUMENTS

| | | | |
|---|---|---|---|
| 5,267,047 A * | 11/1993 | Argenta et al. ............. 358/400 |
| 5,574,977 A * | 11/1996 | Joseph et al. ............... 455/450 |
| 6,208,865 B1 * | 3/2001 | Veerasamy .................. 455/450 |
| 6,798,872 B1 * | 9/2004 | Matsumoto et al. ... 379/142.01 |
| 2004/0213208 A1* | 10/2004 | Baratz et al. ............... 370/352 |

* cited by examiner

*Primary Examiner*—Binh K. Tieu
(74) *Attorney, Agent, or Firm*—Sughrue Mion pllc.

(57) ABSTRACT

A method and apparatus for providing a telephone subscriber with data of uncompleted calls. A determination unit detects an uncompleted call by receiving a signal from a telephone switch or by monitoring the operation of the network exchange switch. The switch is then interrogated to provide the call details. The data is stored in a format for forwarding to the called party.

20 Claims, 10 Drawing Sheets

| Called Party line | Calling party no. | Time of Last call | No of calls From same party |
|---|---|---|---|
| 08 936 2305 | 03 974 4214 | 17:43 | 1 |
| 08 936 2305 | 04 678 2304 | 23:14 | 3 |

Fig. 9

INCOMPLETE CALL NOTIFICATION

FIELD AND BACKGROUND OF THE INVENTION

The present invention relates to notification of incomplete calls and, more particularly, but not exclusively to a method and apparatus for supporting notification to a called party regarding calls made to him which for one reason or another he did not answer.

At present there are two main groups of incomplete call notification systems. The first and most widespread of these, currently applying to both mobile and wireline systems, is voice mail. In the wireline version, a call which remains unanswered after a timeout is transferred to a mailbox. A message is read out to the caller who leaves a message after a tone. Additionally a call may be transferred to a mailbox when the called telephone is busy. In the wireless version the called telephone may be in one of three unavailable states, busy, not available on the network and available but not answering. In all three states it is desirable to divert a caller to the mailbox.

The disadvantage of the mailbox is that voice messages require relatively large amounts of storage. Thus a mailbox, or voicemail, service is often provided as an extra for which the user pays.

A second solution is caller ID. In the wireline environment a caller ID device extracts the caller line identification (CLI) information from an incoming call, possibly together with date and time information and displays the information on a screen. The device may be able to display a certain number of previous callers, and may be incorporated into a telephone or may be included in a stand-alone device. The caller ID devices do not discriminate between completed and non-completed calls. In the wireless environment, if a call reaches a mobile telephone then the caller ID details are generally available to the user, again irrespective of whether the call was completed. If however the telephone is disconnected at the time of the call, then the voice mail facility is the only way that the user can know about the call.

Caller ID has been extended in the wireless environment to situations in which the mobile telephone is not connected at the time of the call. In such a case a network switch detects details of the incomplete call and sends those details as an SMS message to the mobile telephone. The message is then received the next time the user connects to the network and the user is notified of the uncompleted call.

The disadvantage of caller ID in the wireline environment is that it is dependent upon suitable equipment at the user end. The mobile solution is of course not applicable to the wireline environment since fixed telephones are not generally able to handle SMS messages.

Nevertheless it is desirable to notify a user whenever possible of non-completed calls so that the user has the opportunity to return the call. From the point of view of the service provider, every non-completed call is a source of lost revenue and every opportunity to inform a user of the incomplete call is an opportunity to recover that revenue.

There is thus a need for, and it would be highly advantageous to have, a way of notifying a user of incomplete calls which is effective for the wireline environment, which is not associated with a voicemail facility or like resource-intensive features, and preferably which can also provide details of calls which are aborted prior to any time out period.

SUMMARY OF THE INVENTION

According to one aspect of the present invention there is provided incomplete call notification apparatus comprising:
a determination unit for detecting an uncompleted call by at least one of receiving a signal from a telephone switch and monitoring operation of said switch,
an interrogation unit for obtaining, from the switch, call data of the uncompleted call, the call being to a given called party, and
a forwarding unit for arranging the called data into a format for forwarding to the called party.

According to a second aspect of the present invention there is provided incomplete call notification apparatus comprising:
an input for receiving last call data from a telephone network switch, the last call data comprising at least caller identification information,
a database for storing at least the caller identification information from the input, and
a data retrieval unit, associated with the database and activatable from a telephone for forwarding the caller identification information to a called party.

According to a third aspect of the present invention there is provided incomplete call notification database and retrieval apparatus comprising:
a database, associated with a telephone network, for storing caller identification information for a given called subscriber whenever a call to the subscriber is not completed, the database being located remotely from the subscriber, and
a retrieval unit, associated with the database and activatable from a telephone for forwarding the caller identification information to the given subscriber.

According to a fourth aspect of the present invention there is provided incomplete call notification database and retrieval apparatus comprising:
a database associated with a telephone network and for storing caller identification information for a given called subscriber whenever a call to the subscriber is not completed, the database being located remotely from the subscriber,
an aggregation unit, associated with the database and comprising:
a comparator for determining whether current call identification information is the same as already stored caller identification information, and
an aggregator, associated with the comparator, for arranging the current call identification information together with any already stored caller identification information identified by the comparator as a single item, and
a retrieval unit for allowing a called party to access the arranged item.

According to a fifth aspect of the present invention there is provided a method of obtaining sources of incomplete calls over a telephone network comprising:
setting a network exchange switch with a protocol for sending caller identification information of calls made through the switch and not completed, the caller identification information being indicative of the source,
receiving the caller identification information at a notification platform on the network, and
forwarding the caller identification information to the respective called party.

According to a sixth aspect of the present invention there is provided a method of obtaining sources of incomplete calls over a telephone network comprising:

setting a network exchange switch to signal to a notification platform that a call has been placed through the switch and not completed, receiving the signal at a notification platform on the network, requesting stored last call data from the switch in response to the notification, the last call data being at least indicative of a respective source, and arranging for forwarding of data indicative of the source to the respective called party.

According to a seventh aspect of the present invention there is provided a telephone network exchange switch set to:

detect when a call is released by a calling party without being completed by answering at a called party, issue an incomplete call signal to a predetermined location, the incomplete call signal being indicative of the detection, upon receipt of a reply to the signal, output stored last call data.

According to an eighth aspect of the present invention there is provided a telephone network exchange switch set to:

detect that a call is released by a calling party without being completed by answering at a called party, obtain caller identification information of the calling party, and send the caller identification information to a predetermined location for retrieval by the called party.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments show a method and apparatus for extracting caller identification information from a network switch following aborting of a call, the incorporation of that information into a database and the retrieval of that data at a standard wireline telephone by a called party.

The principles and operation of last caller identification according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
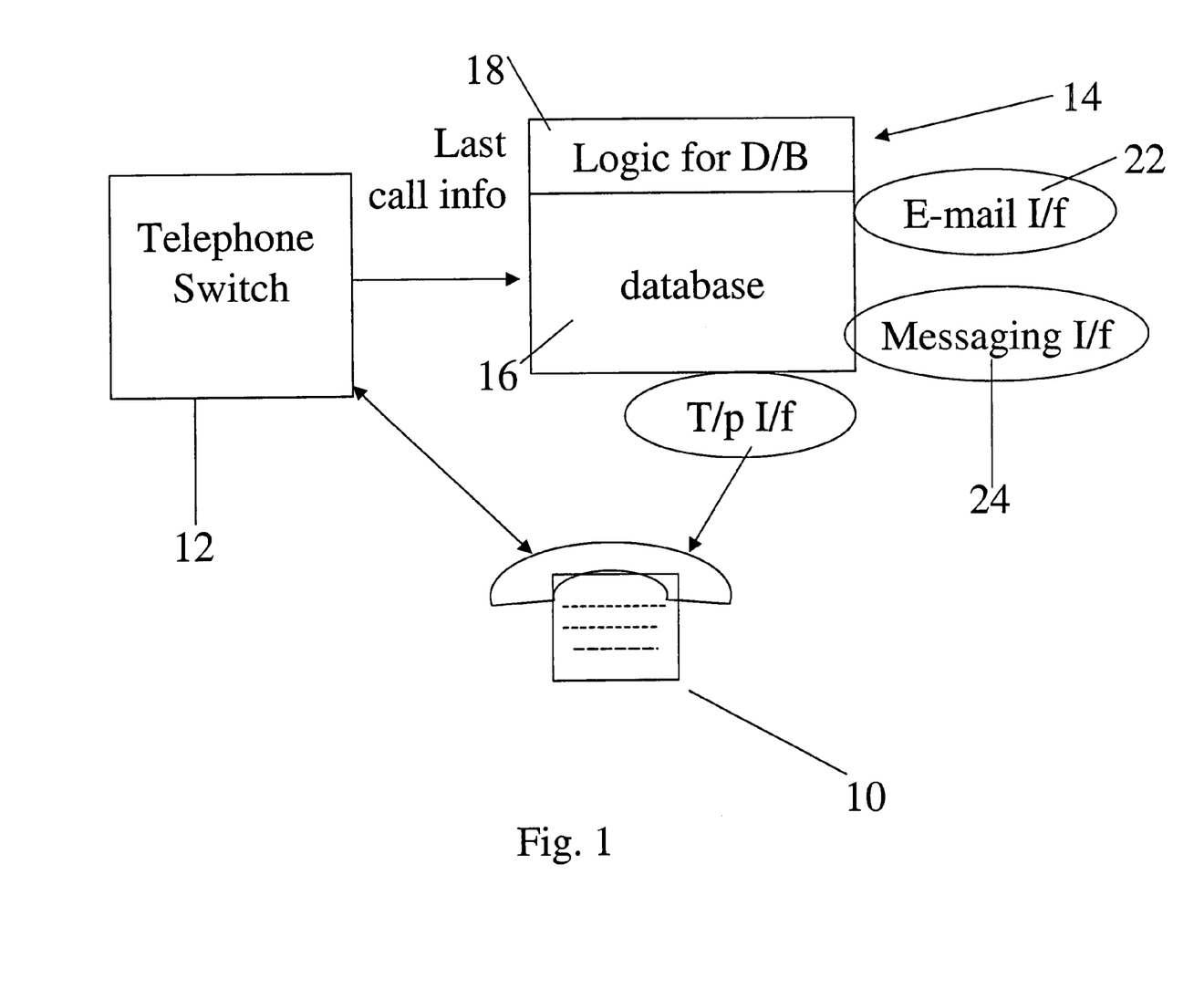
FIG. 1 is a simplified block diagram illustrating a network-based arrangement for notifying a user of incomplete calls, according to a first embodiment of the present invention.

Referring now to the drawings, FIG. 1 illustrates an embodiment of an incomplete call notification apparatus according to the present invention. A telephone 10 is connected to a telephone exchange switch 12 in the normal way. For example, the telephone 10 may be a standard wireline telephone connected to the Public Switched Telephone Network (PSTN) and the switch 12 may be any switch forming part of the PSTN.

The switch 12 typically connects a call to a called party, ensures that the telephone of the called party rings, and obtains information of the call such as the identity of the calling party. Generally the data that is available is the caller line identification (CLI). The switch 12 tends to be aware of whether a call is completed or not since a non-completed call is not billed and may need to be rerouted to a voicemail service if there is one. A time out function at the switch 12 for example may disconnect a calling party after a certain time and reconnect the calling party to such a voicemail facility. However telephone 10 does not necessarily have a voicemail facility. Even if it has a voicemail facility the calling party may terminate the call before the timeout is activated so that the calling party is not transferred to the voicemail facility. Furthermore, even if the calling party is successfully transferred to the voicemail, he may disconnect without leaving a message.

Typically switch 12 automatically retains the information it has gathered about the last call information, such as the number of the calling party and the time at which the call was made. The last call information is generally not used in conventional systems and is later overwritten.

In the present embodiments, the switch 12 is connected to database apparatus 14, which is able to extract from the switch the retained last call information whenever it is determined that the last call was not completed. A determination that a last call was not completed may be made in various embodiments at the switch 12 itself or at the database apparatus 14.

Database apparatus 14 comprises a database 16 and database logic 18. Database logic 18 communicates with the switch 12 to obtain information therefrom and manages data input, storage and output with the database 16. The database apparatus 14 preferably also has a telephone interface 20 which interfaces the database for communication to a telephone. Thus, as will be described in greater detail below, the telephone interface 20 may have a facility for indicating via telephone 10, that last call data is waiting in the database, may be able to issue voice instructions to the user to provide dual tone multi frequency (DTMF) commands for obtaining the data, and may have a facility for reading the data as voice to the user.

Preferably, when a first entry is made in the database 16 following downloading of data to the user, the telephone interface 20 sets a notification. The notification may cause an indicator to light up or flash on the called party's telephone handset to let him know that there is call information to download. Typically the notification may cause a broken dialing tone, or stutter tone, to be heard when the receiver is lifted, as is commonly provided in existing voicemail systems.

As an alternative or in addition to the telephone interface 20, the database apparatus 14 may comprise an e-mail interface 22 for sending last call data to a preselected e-mail address and/or a messaging interface 24 for sending the last call data as a text or chat message to a preselected mobile telephone number or I.P. address. It will be appreciated that since e-mail and messaging can be sent out instantaneously, and there is no need for the called party to connect up before the data can be sent, in embodiments having the e-mail interface 22 and/or messaging interface 24, the database 16 is not needed.

Figure 2:
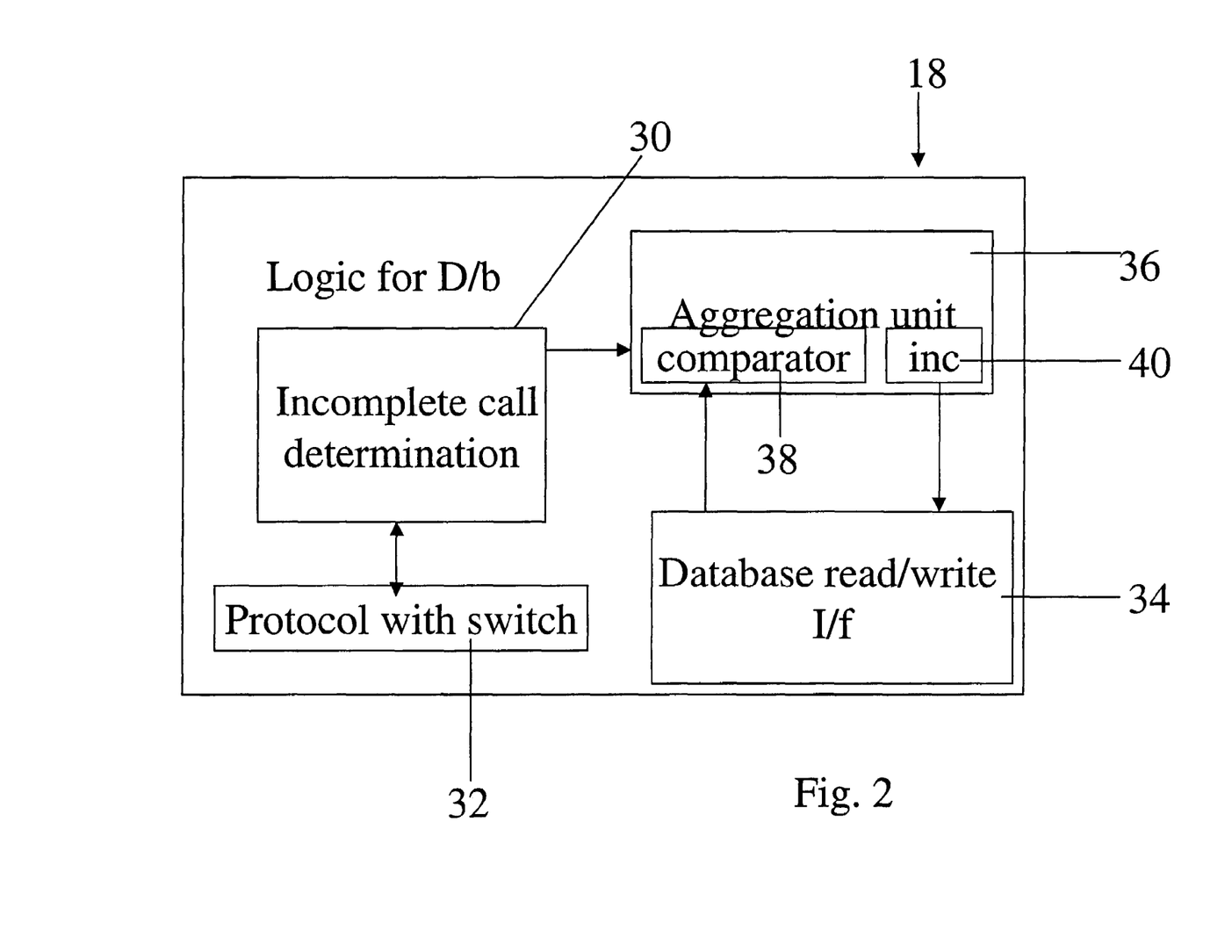
FIG. 2 is a simplified block diagram showing an implementation of the database logic of FIG. 1 according to a pre-storage amalgamation embodiment of the present invention.

FIG. 2 shows an embodiment of the database logic 18 of FIG. 1 in greater detail. Database logic 18 preferably has an incomplete call determination unit 30 which determines that an incomplete call has occurred. The unit 30 preferably determines the occurrence of incomplete calls according to a number of incomplete call types. Operation of the incomplete call determination unit 30 is described below.

The database logic 18 communicates with switch 12 via an interrogation unit. In the described embodiment, the interrogation unit is a protocol unit 32. The protocol unit 32 uses a communication protocol to communicate with the switch 12 in order to obtain data regarding the incomplete calls. The protocol may thus include a command that tells the switch 12 to issue a signal upon detection of an incomplete call to a given party, and a command that tells the switch 12 to download last call data immediately following such an incomplete call, or upon request. The exact content of the protocol typically depends on the switch type, and different command sets may be suitable for different switches.

A further embodiment uses different kinds of notification for different message types. An example is notifying the user of a call he missed because the telephone was busy. It is possible to notify the user directly when the line becomes available of the missed call.

Data of the incomplete call as received by the database logic 18 using the protocol 32, is then written into the database 16 via a forwarding unit. The described embodiment, the forwarding unit is database read-write interface 34. A preferred feature of the present embodiments is an aggregation unit 36 which is designed to ensure that multiple calls from the same source are stored as a single entry in the database, but the invention is not limited in this respect. Aggregation unit 36 preferably includes a comparator 38 for comparing the number of a current calling party with numbers already stored in the database, and an aggregator or incrementer 40. If a match is found then the data of the current call is not entered into the database as a separate entry. Rather the existing entry that has been matched by comparator 38 is updated with the current time, and incrementer 40 increments a field in the matched entry to indicate the number of times the entry has been updated.

In an alternative embodiment, hereinafter referred to as post-storage aggregation, all call attempts are recorded as separate items in the database. Aggregation is carried out upon call retrieval by comparing database entries and reading out each called party number once only regardless of how many times it appears. Upon request, the user is additionally able to retrieve the number of times the given number appears.

Operation of the incomplete call determination unit 30 is as follows. The unit may in one embodiment detect an incomplete call by monitoring operation of switch 12. Alternatively actual detecting may occur at switch 12 and determination unit 30 may simply respond to a signal received from switch 12.

Incomplete calls are of a number of types. For example one type of incomplete call may be any call where the calling party hangs up without the call being answered, hereinafter 'hangup' type. Another type of incomplete call may be a call made to a telephone that is currently busy, hereinafter 'busy' type. Yet another type of incomplete call may be any call that remains unanswered after a timeout is reached, hereinafter 'timeout' type. A further type of incomplete call is one in which the calling party is transferred to the voicemail but does not leave a message, hereinafter 'slam-down' type. In mobile telephony a further type of incomplete call is one in which the mobile telephone that is called is not detected on the network, either because it is switched off or it is not in range of a signal.

Most wireline voicemail systems respond only to the timeout type although a response to the busy type is growing more common. Voicemail is intrinsically unable to respond to the hangup type since the calling party disconnects before he can be transferred to the voicemail. Voicemail can, but typically does not, respond to the slam-down type. The incomplete call determination unit 30 can thus be configured to supplement an existing voice mail by responding to hangup and slamdown incomplete call types, and also to the busy type if the voicemail does not respond to busy type. In the absence of a voicemail system, the incomplete call determination unit 30 is preferably configured to respond to hangup, timeout and busy incomplete call types. It is noted that there may often not be a timeout type in the absence of a voicemail system.

Figure 3A:
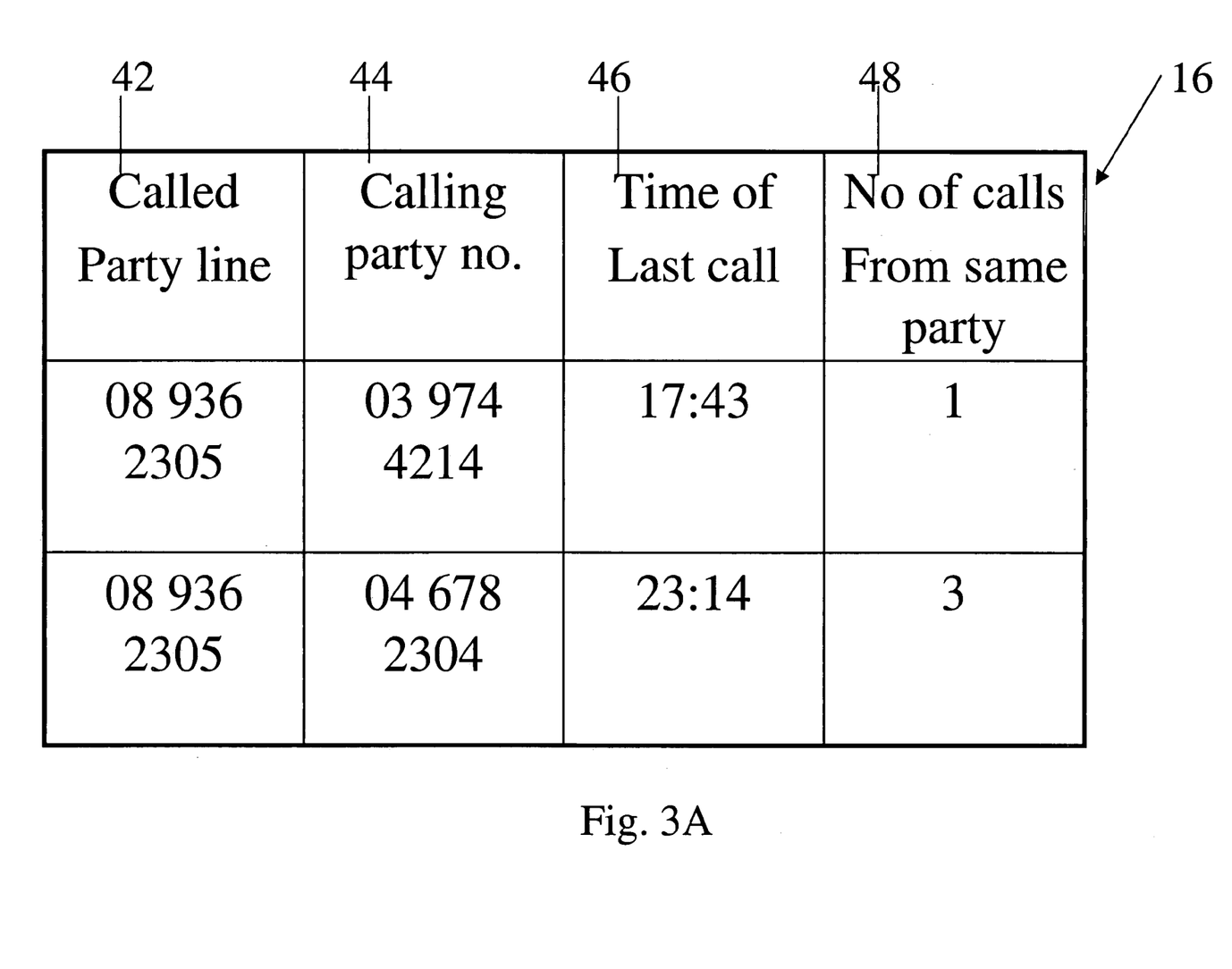
FIGS. 3A and 3B are simplified diagrams illustrating database structure according to pre- and post-storage amalgamation embodiments of the present invention respectively.
Figure 3B:
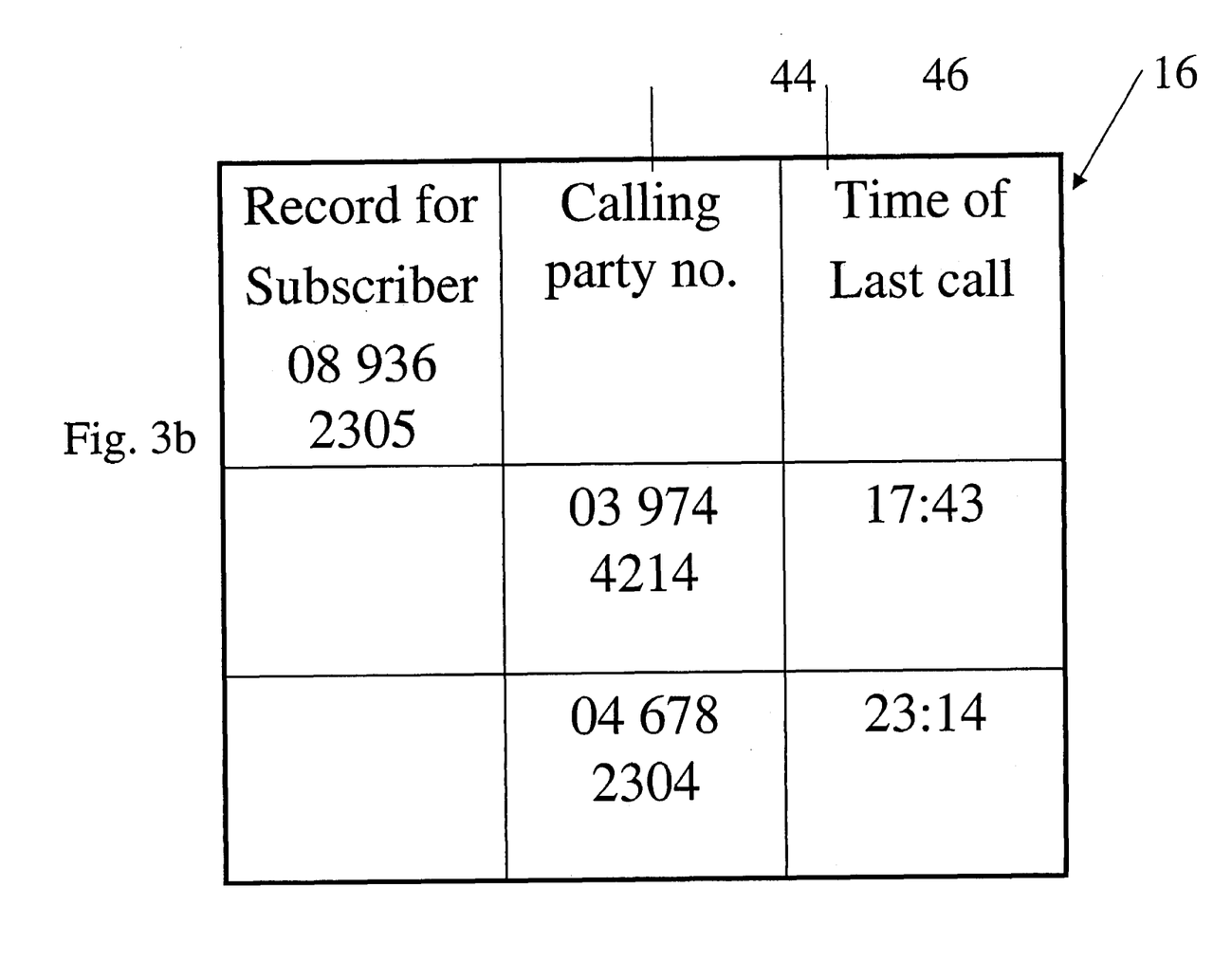

Reference is now made to FIGS. 3A and 3B, which are schematic diagrams indicating two typical structures of the database 16 of FIG. 1. The database as shown in FIG. 3A includes four fields, a called party field 42 which indicates the telephone number of the called party, a calling party field 44 which indicates the telephone number of the calling party, a time of last call field 46 which indicates the time of the last incomplete call made from the given calling party to the given called party, and a number of calls field 48 indicating the number of times the given calling party has called the given called party. The skilled person will appreciate that the called party field may be dispensed with if the database is configured on a per-subscriber basis, that is to say if the database 16 contains only calls to the given subscriber.

As explained above in connection with the aggregation unit 36, in the event that two or more calls are received from the same calling party, the existing entry is simply updated with the call time of the later call and the number of times called field 48 is incremented.

FIG. 3B shows entries in a record for a given subscriber. In FIG. 3B, only the calling party field 44 and the time field 46 are used. The record structure of FIG. 3B is for use with post-storage amalgamation, that is with an embodiment in which each call is recorded as a separate entry. Amalgamation of entries relating to the same calling party is carried out during data retrieval, as explained with reference to FIG. 9 below and thus there is no use for a number of times called field.

Figure 4:
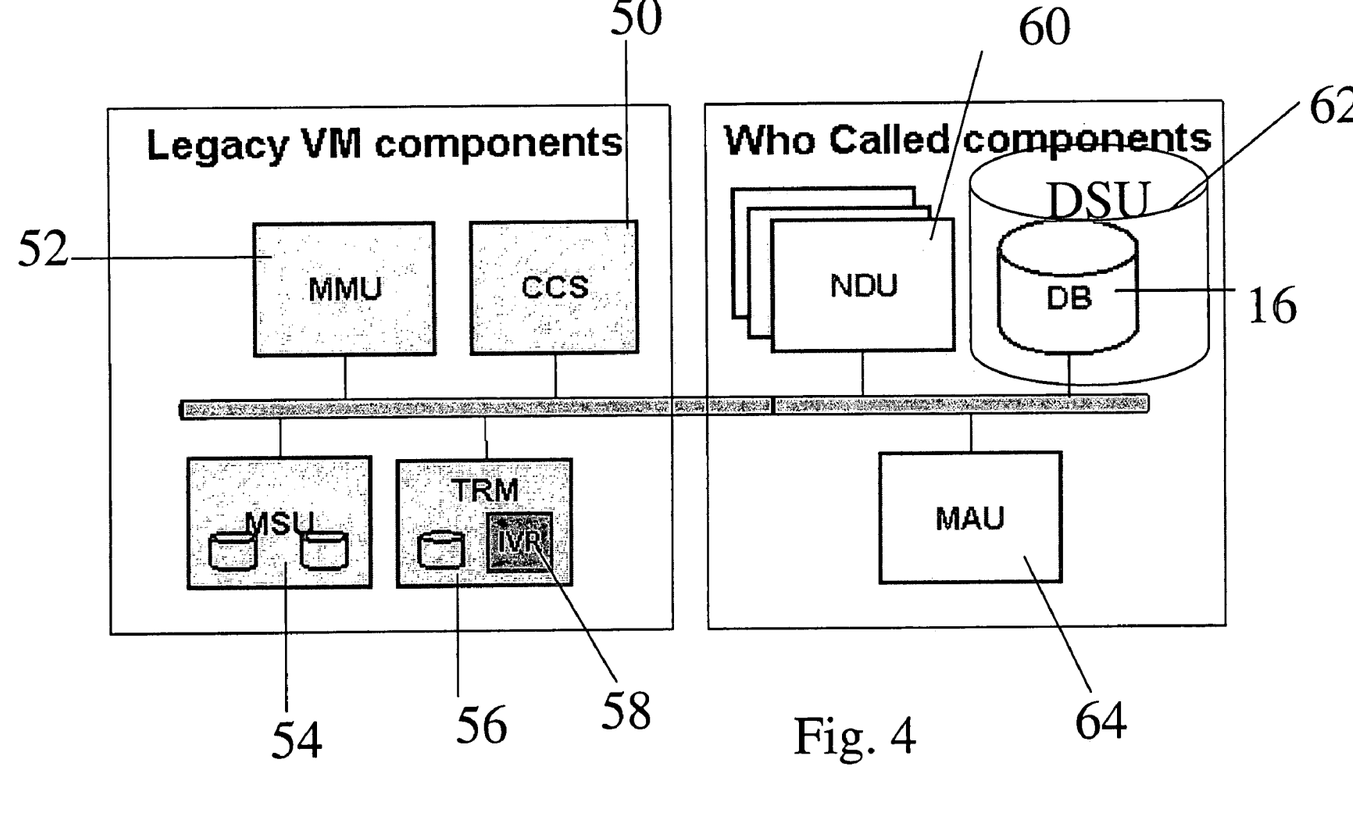
FIG. 4 is a simplified block diagram illustrating a network implementation of incomplete call notification as additional components to a voicemail platform.

FIG. 4 is a simplified block diagram illustrating a typical voicemail platform incorporated into the PSTN network and showing how the platform may be adapted to incorporate an embodiment of the present invention. The voicemail platform illustrated is the Legacy Trilogue system belonging to the present assignee. Other platforms tend to incorporate the same overall functionality, albeit partitioned differently in terms of component blocks and the skilled person will appreciate how the same principles can be applied to such other platforms. The platform without adaptation includes the following components:

a call control server (CCS) 50, which handles the network signaling interaction for all the other components in the voicemail platform;

a multimedia unit (MMU) 52 which provides a telephone interface for the messaging system as a whole. MMU 52 in particular provides resources required for user interaction over a telephony user interface (TUI), as will be explained in greater detail below;

a messaging and storage unit (MSU) 54 is the application server for the platform. For the purposes of the present embodiments, the MSU is configured to play voice prompts and call details to the user, and to receive DTMF tones as issued by the user;

a task and resource management (TRM) module 56 is the platform's management and control unit. It also acts as a central access point for external interfaces, administration, billing and alarm functions; and an interactive voice response engine (IVR) 58, a logical component, hosted on the TRM 56, and whose task is to define call flow. The IVR 58 handles the TUI session and activates MSU 54 resources as required. When configured with the present embodiments IVR 58 is a data retrieval unit that takes on the additional role of accessing database 16 to retrieve missed call data.

In addition to the standard platform components as listed above, preferred embodiments also incorporate the following additional components:

a notification delivery unit (NDU) 60—The NDU serves as a central notification platform and in particular hosts two applications:

a notification delivery server (NDS) which handles notification logic and profiles; and a smart mobile gateway (SMG), a logical component which interfaces with SMSC servers and Signaling servers (CCS). The SMG handles interface protocols and routing messages to the correct SMS Center (SMSC) in any given case;

a database server unit (DSU) 62 collects details of all the calls made to a given subscriber, aggregates calls from the same calling party as described above and takes responsibility for notifying the called party. The DSU 62 encapsulates database 16 (DB) as well as database logic 18 as described hereinabove; and a management applications unit (MAU) 64, which the present embodiment preferably uses as a primary monitoring point for simple network management protocol (SNMP)-based management systems. The MAU functions as the management unit of the Unified Messaging platform.

Figure 5:
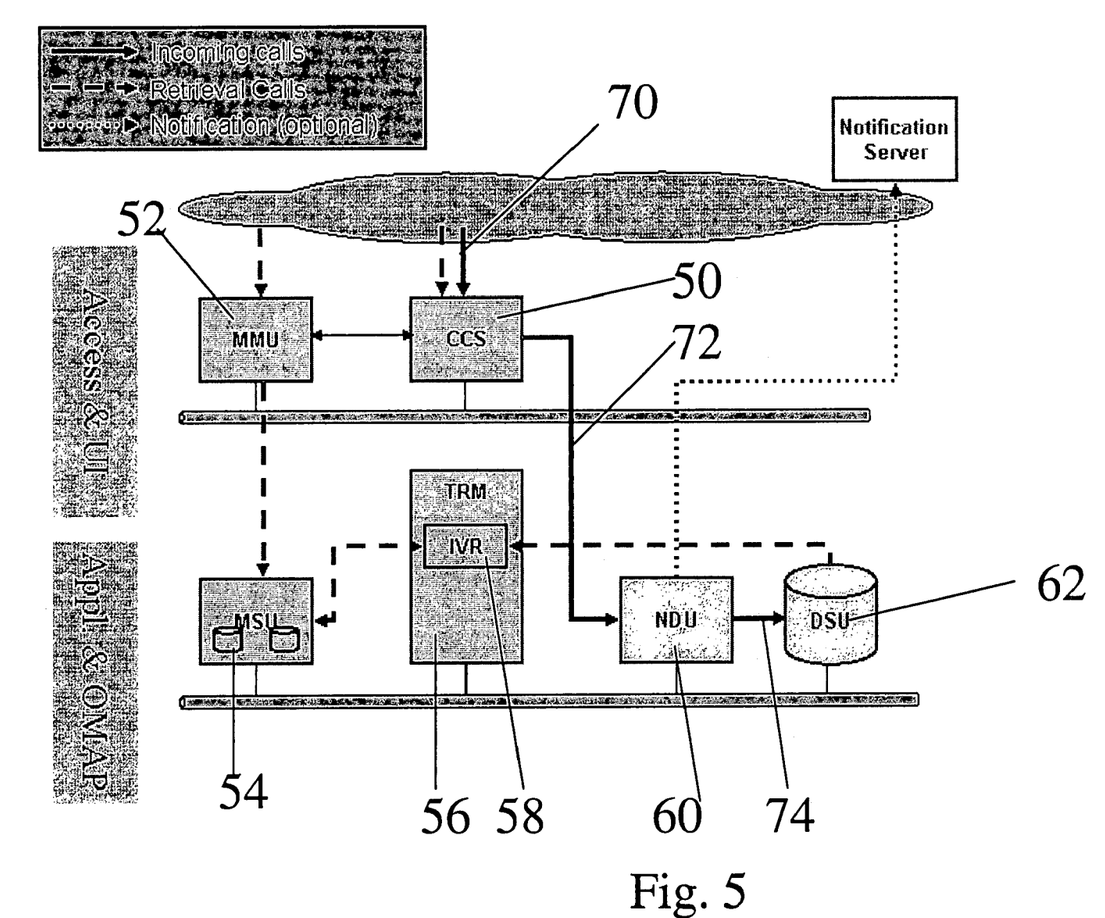
FIG. 5 is a simplified diagram illustrating signal and message routing via the components of the platform of FIG. 4.

FIG. 5 is a simplified diagram illustrating signal routing around the platform and indicating how the components of FIG. 4 interact in the present embodiments. Parts that are the same as in FIG. 4 are given the same reference numerals and are not described again except to the extent necessary for an understanding of the present figure. Signal routing is indicated by arrows. Under standard platform operation, unanswered calls at the switch 12 are forwarded to the voicemail platform, typically following a timeout and possibly also upon detection of a busy signal at the called party. The forwarded call is typically received at CCS 50 where the call is registered by the service. Every call that is terminated by the CCS is immediately released, or optionally a prompt can be played first, in order to avoid billing, and the call details are stored at the database 16.

The standard operation is carried out using call forwarding definitions set at switch 12. In the standard operation calls released by the calling party before the issuance of the time out signal, the hangup type, are not registered.

Thus, according to the invention, standard operation is preferably modified to enable forwarding of hangup type uncompleted calls. The modification does not use call forwarding at the switch. Instead, a signaling event is issued by the switch. The signal may be part of any suitable protocol used on the network. For example, the protocol may be integrated services digital network user part (ISUP) or intelligent network application protocol (INAP), but the invention is not limited in this respect. The signal is preferably issued upon call release in the event of the call not being answered, and can be issued irrespective of the issuance of a time out signal, therefore allowing hangup type unanswered calls to be included. An additional advantage of using signaling in place of call forwarding is that, at the operational level, the solution eliminates the voice traffic costs between the switch 12 and the CCS 50 and MMU 52, and may even eliminate the need to make an E1/T1 connection, depending on how the switch is connected to the platform.

Thus, upon call release at the switch, the switch issues a call release signal via arrow 70, to the CCS 50. The CCS 50 responds by communicating with the switch 12 to capture the call data. Then the CCS 50 sends the call data to the NDU 60 via arrow 72.

The NDU 60 preferably forwards the call data to DSU 62 which then processes the data for insertion into the database 16. Preferably the database is structured as a series of records, one for each subscriber, and the data is inserted as a new entry under the called party's record. If the current call is the first new call made to the subscriber, then the NDU 60 is alerted and preferably sends a request to CCS 50 to activate a notification at the subscriber's phone via a communication protocol. The communication protocol may be, for example, SS7, TCAP or SMDI protocols, but the invention is not limited in this respect. The notification may be in the form of a stutter tone or the flashing of an indicator light, as discussed above, but the invention is not limited in this respect. Subsequent calls to the same called party are then registered directly, without further activation of the notification.

Data retrieval by the user is now described. The called party arrives at his telephone and notes from the indicator that missed call information is available. The called party dials a service number, and is routed to the CCS 50. A voice channel is set up with the MMU 52. The IVR 58 preferably takes control of call flow.

In the present embodiment, verification of the user is via the telephone number of the incoming call, and thus the user is required to call from his own telephone in order to retrieve the data. However, in alternative embodiments the addition of password protection may allow a user to authenticate himself so as to receive data via a different telephone line.

In addition to the configuration shown herein, it is also possible to substitute use of IVR 58 with an external IVR that is not hosted on the TRM 56, for example during periods of high traffic.

Following verification of the caller, the IVR 58 retrieves the corresponding record from database 16. In the post storage aggregation embodiment, the IVR 58 aggregates multiple call attempts from the same calling party into a single item. In pre-storage aggregation the multiple call attempts are already arranged into single items. Whichever of pre- or post-storage is used, the different items from the different calling parties are then sent in turn to the MSU 54. The MSU 54 reads out the telephone number over the voice connection, as well as additional call details such as the time stamp and the number of attempts. The additional details may be read out automatically or may require a specific request by the user. Also, upon user request, a return call may be initiated. At the end of the session, the IVR 58 preferably deletes the record at database 16. Alternatively, the IVR 58 may simply mark all downloaded entries as old.

For the various other notification routes mentioned above, e-mail, chat notifications and text messaging, it is not necessary to store the call details. Rather a notification is composed upon receipt of the data of the uncompleted call. The notification may then be dispatched directly to the subscriber.

Another notification route is via a Web interface. An individual may be provided with a web page on which he is able to view his database of missed calls.

Figure 6:
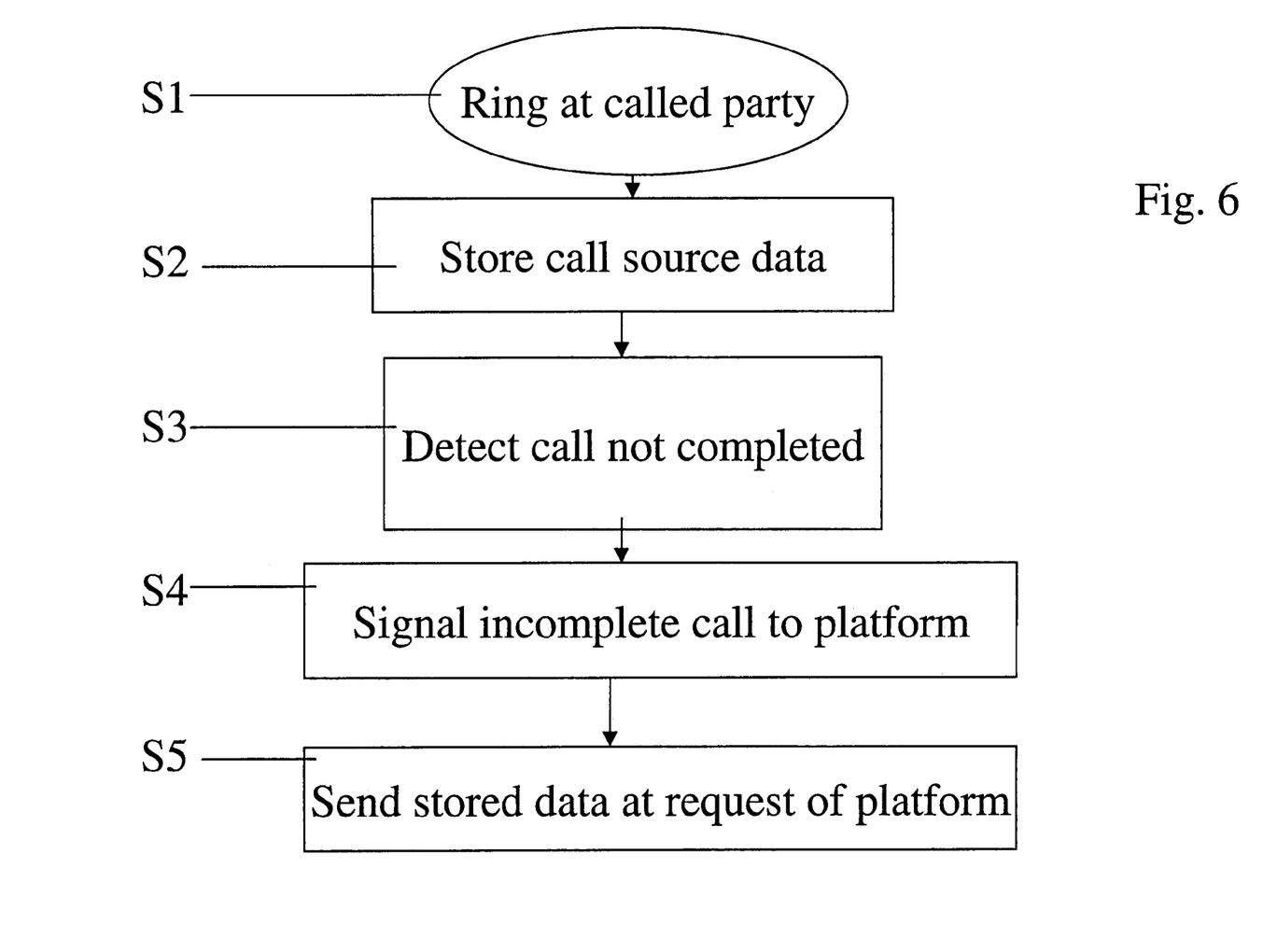
FIG. 6 is a flow diagram illustrating operation of a network exchange switch according to an embodiment of the present invention.

FIG. 6 is a flow chart illustrating operation of a network switch according to a preferred embodiment of the present invention. In a stage S1 the switch connects a call to a called party. In stage S1, the telephone rings at the called party, unless of course the telephone is busy, in which case a busy signal is received. Either way the call data, typically the CLI of the calling party is stored at the switch in a step S2. If the call is not completed, the switch detects non-completion in a stage S3. A signal is then output to the platform in a stage S4 to indicate non-completion of the call. In a stage S5 the switch receives a signal from the platform in response to which it sends the call data stored in stage S2 to the platform.

Figure 7:
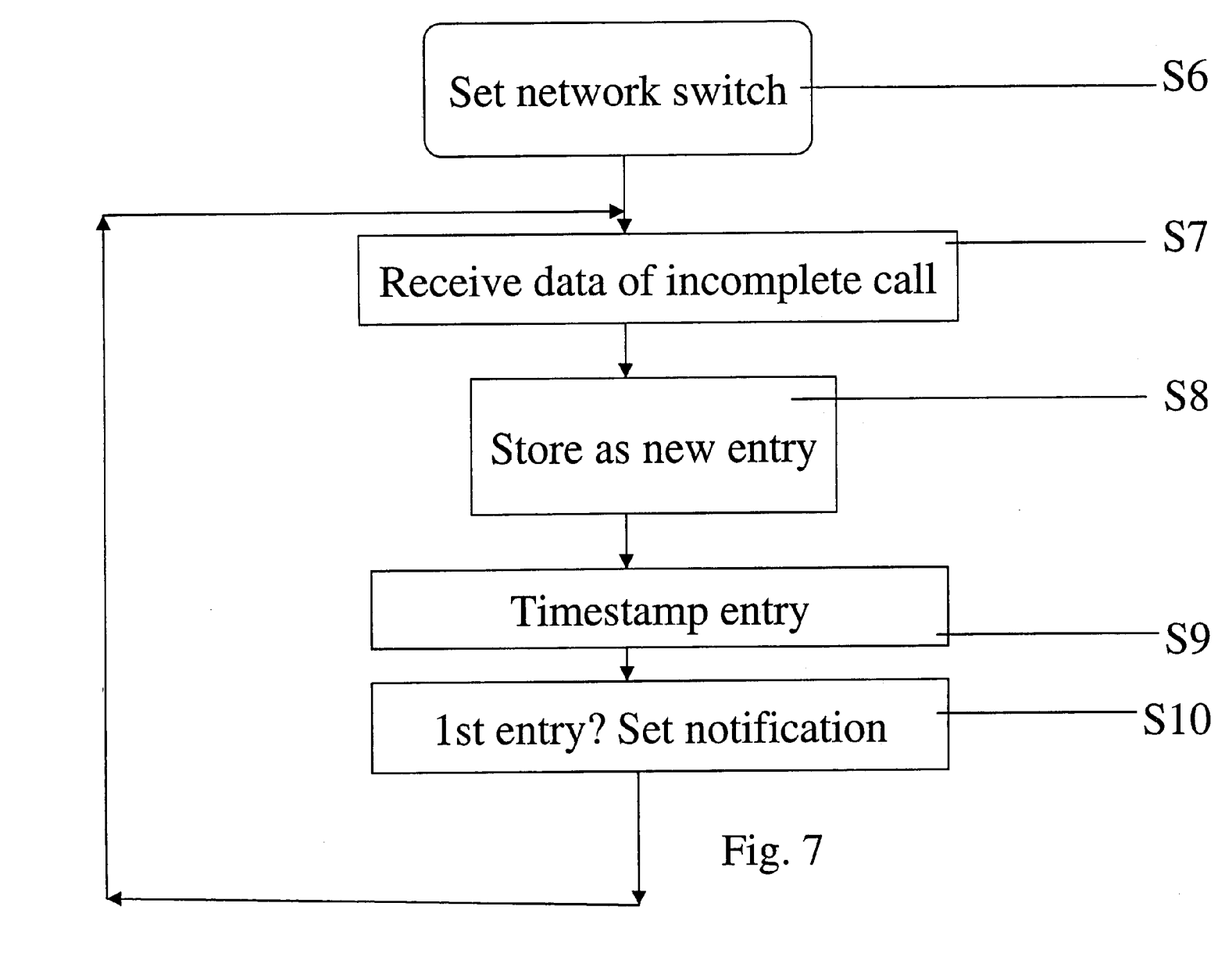
FIG. 7 is a flow diagram illustrating operation of the platform of FIG. 4 in providing incomplete message notification according to the post-storage amalgamation embodiment of the present invention.

FIG. 7 is a simplified flow chart detailing operation of the embodiment of the platform. In the embodiment of FIG. 6, the platform sets up a protocol link with the switch in a stage S6. Setting up the protocol link may involve minor reprogramming to the switch, depending on the model of switch being used.

Once the protocol link has been set up, a monitoring process for incomplete calls may begin. In a stage S7, the platform receives a signal from the switch to indicate that an incomplete call has been detected. Preferably the platform checks whether the called party who is the object of the detected call is a subscriber for which it keeps incomplete call records, and if so the call is stored as a new entry in the database record for that subscriber in a stage S8. The entry is timestamped at a stage S9, and if the entry is a first new record for the given subscriber then in a stage S10 a notification is set to alert the subscriber to the presence of incomplete call data.

Figure 8:
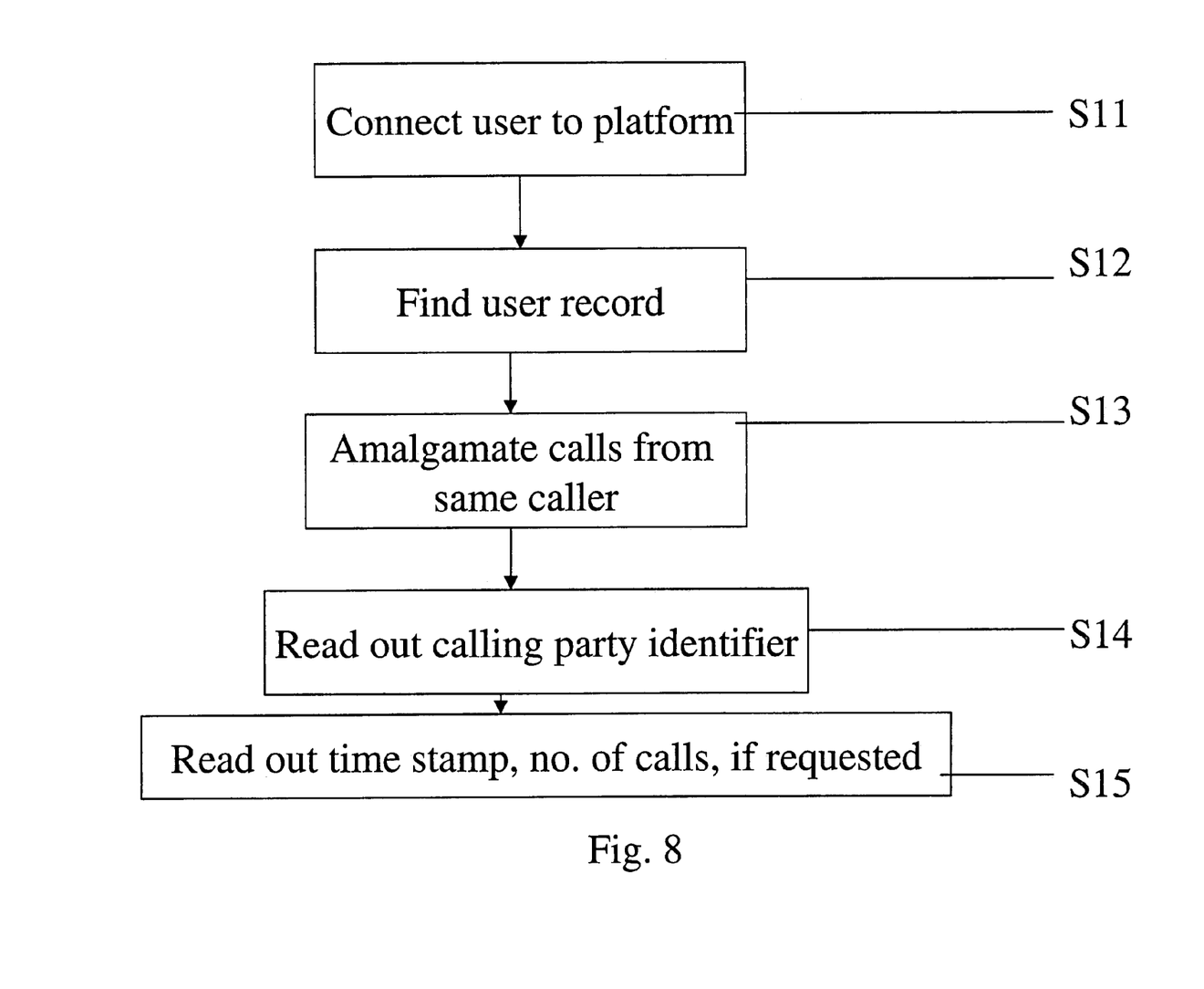
FIG. 8 is a simplified flow diagram illustrating operation of the platform of FIG. 4 when a user downloads incomplete call information.

FIG. 8 is a simplified flow diagram indicating the procedure at the platform according to an embodiment when a called party wishes to retrieve data of his incomplete calls. The called party dials a service number and is connected to the platform in a stage S11. In a stage S12 the record in the database for the called party is retrieved. In a stage S13 all of the calls from the same calling party are amalgamated into a single item. It will be appreciated that in the pre-storage amalgamation embodiment, the data in the record is already arranged so that only a single item appears for each calling party. In a stage S14 the calling party identifier, typically his telephone number, is read out. In a stage S15, further data may be requested, in particular the time of the call, and the number of calls made by the same subscriber. The user may also be given an opportunity to connect to the calling party so identified.

In preferred embodiments the system can ask the user for a password. If the telephone is used as the retrieval device then the password can be entered via the DTMF keys. If the retrieval device is a web page then the password can be entered via a suitable web password interface.

Briefly summarizing, the methods of retrieving the missed calls can be divided into three groups as follows:

Triggered by MWI

An MWI signal, such as a stutter tone of flashing lamp is generated if there are new missed calls awaiting download.

The caller dials a short code to listen to the list of missed calls, and Connection with the system cancels the MWI signal.

Triggered by Subscriber

The subscriber can, at any time, key in a defined code and listen to details of his missed calls if any. Possible modes of operation provide either new missed calls only or any missed calls over a predetermined period, such as all missed calls over the previous twenty four hours, or a given number of missed calls.

Out Going Call (Push)

The system makes an out going call notifying the end-user about missed calls. The latter type of notification is useful if the reason the call was not completed is that the telephone was busy. The system can detect release of the telephone and immediately provide data of the missed calls.

Figure 9:
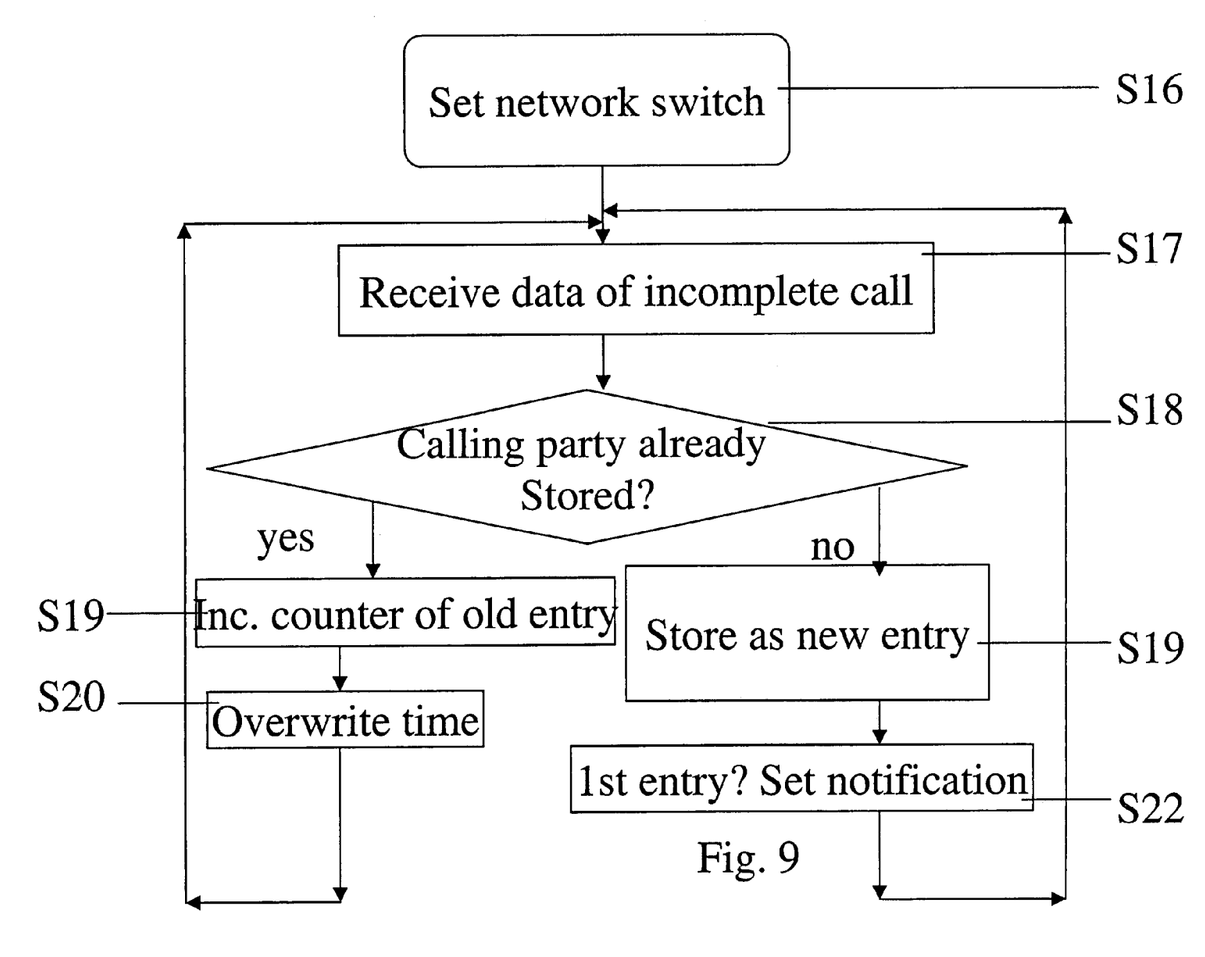
FIG. 9 is a simplified flow diagram illustrating operation of the platform of FIG. 4 in providing incomplete message notification according to the pre-storage amalgamation embodiment of the present invention.

FIG. 9 is a simplified flow diagram illustrating an alternative procedure to the embodiment of FIG. 7. More particularly FIG. 9 shows the procedure at the platform for the embodiment in which amalgamation is carried out prior to data storage. In FIG. 9, the network switch is set up with the protocol as before in a stage S16. In a stage S17 a signal is received from the switch indicating an incomplete call. The data of the incomplete call, typically identifying the calling party, is received. Prior to storage, the identity of the calling party is compared with the existing entries for the given called party in a comparison stage S18. If another entry for the same called party is found then the procedure enters the yes branch. The existing entry is simply updated by incrementing the number of calls—stage S19 and the timestamp is overwritten in stage S20. If no other entry is found then processing follows the no branch and a new entry is made in the database in stage 21. If the new entry is the first entry in the record of the given called party then in a stage S22 a notification is set as explained above.

It is expected that during the life of this patent many relevant forms of network switch and exchange and protocols for using the same, and wireline telephones will be developed and the scope of these and other terms in this disclosure is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Incomplete call notification apparatus comprising:
a determination unit for detecting an uncompleted call by at least one of receiving a signal from a telephone switch and monitoring operation of said switch,
an interrogation unit for obtaining, from said switch, call data of said uncompleted call, said call being to a given called party, and
a forwarding unit for arranging said called data into a format for forwarding to said called party, wherein said forwarding unit comprises a database for storing said data for retrieval by said called party,
wherein said database is associated with an aggregation unit, comprising a comparator for determining whether said obtained call data is the same as already stored call data in said database, and
an aggregator, associated with said comparator, for aggregating together said obtained call data with any already stored call data identified by said comparator, thereby to output said obtained and already stored called data together as a single item.

2. Incomplete call notification apparatus according to claim 1, wherein said forwarding unit comprises e-mail functionality for sending said data as an e-mail to a predetermined e-mail address.

3. Incomplete call notification apparatus according to claim 1, wherein said forwarding unit comprises messaging functionality for sending said data as a text message to a predetermined text-enabled destination.

4. Incomplete call notification apparatus according to claim 1, wherein
the comparator determines whether current call data is the same as any already stored call data in said database, and
the aggregator stores said current call data together with any already stored call data identified by said comparator.

5. Incomplete call notification apparatus according to claim 1, wherein said call data comprises caller line identification (CLI).

6. Incomplete call notification apparatus comprising:
an input for receiving last call data from a telephone network switch, said last call data comprising at least caller identification information,
a database for storing at least said caller identification information from said input, and
a data retrieval unit, associated with said database and activatable from a telephone for forwarding said caller identification information to a called party;
wherein said database is associated with an aggregation unit comprising:
a comparator for determining whether current caller identification information is the same as already stored caller identification information in said database, and
an aggregator, associated with said comparator, for aggregating together said current caller identification information any already stored caller identification information identified by said comparator, thereby to output said current and said already stored caller identification information as a single item.

7. Apparatus according to claim 6, wherein said data retrieval unit is activatable by DTMF tones of said telephone.

8. Apparatus according to claim 7, wherein said data retrieval unit comprises an e-mail facility for sending said caller identification information to a predefined address.

9. Apparatus according to claim 7, wherein said data retrieval unit comprises a messaging facility for sending said caller identification information to a predefined messaging target.

10. Apparatus according to claim 6, wherein said data retrieval unit comprises a vocal readout facility for reading out said caller identification information over said telephone.

11. Apparatus according to claim 6, wherein
the comparator determines whether current caller identification information is the same as any already stored caller identification information in said database, and the aggregator stores said current caller identification information together with any already stored caller identification information identified by said comparator.

12. Apparatus according to claim 6 wherein said storing together comprises incrementing a number of times called field associated with said already stored caller identification information in said database.

13. Apparatus according to claim 6 wherein said database is structured such that said caller identification information is storable in said database together with a time of a respective call, and wherein said storing together comprises replacing a time associated with said already stored caller identification information with a time of said current call.

14. Apparatus according to claim 6, comprising notification functionality arranged such that a first entry for a given called party following a previous data retrieval activates said functionality to provide a notification to said called party that incomplete call data is awaiting retrieval.

15. Apparatus according to claim 14, wherein said notification comprises an audible signal applied to a dialing tone.

16. Apparatus according to claim 6, further comprising incomplete call detection functionality associated with said input for detection of termination of a call without said call being completed by answering at said called party, said detection functionality being arranged to trigger said input to carry out said receiving of said last call data.

17. Apparatus according to claim 16, wherein said incomplete call detection functionality is operable to detect a timeout signal at said switch, therefrom to deduce said termination without completion.

18. Apparatus according to claim 6, wherein said input is operable via a protocol shared with said network switch to receive said last call information whenever said switch detects that a call is released by a calling party without being completed by answering at said called party.

19. Incomplete call notification database and retrieval apparatus comprising:

a database, associated with a telephone network, for storing caller identification information for a given called subscriber whenever a call to said subscriber is not completed, said database being located remotely from said subscriber, a retrieval unit, associated with said database and activatable from a telephone for forwarding said caller identification information to said given subscriber; and an aggregation unit, associated with said database and comprising a comparator for determining whether current call identification information is the same as already stored caller identification information, and an aggregator, associated with said comparator, for arranging said current call identification information together with any already stored caller identification information identified by said comparator as a single item.

20. Incomplete call notification database and retrieval apparatus comprising:

a database associated with a telephone network and for storing caller identification information for a given called subscriber whenever a call to said subscriber is not completed, said database being located remotely from said subscriber, an aggregation unit, associated with said database and comprising:

a comparator for determining whether current call identification information is the same as already stored caller identification information, and an aggregator, associated with said comparator, for arranging said current call identification information together with any already stored caller identification information identified by said comparator as a single item, and a retrieval unit for allowing a called party to access said arranged item.

* * * * *